United States Patent
Wang et al.

(10) Patent No.: US 11,802,169 B2
(45) Date of Patent: Oct. 31, 2023

(54) METHOD OF SEPARATING HEMICELLULOSE THROUGH EFFICIENT PRETREATMENT OF FIBROUS BIOMASS AND COMPREHENSIVELY UTILIZING THE SAME

(71) Applicant: INSTITUTE OF CHEMICAL INDUSTRY OF FOREST PRODUCTS, CAF, Nanjing (CN)

(72) Inventors: Kui Wang, Nanjing (CN); Jianchun Jiang, Nanjing (CN); Yanyan Liu, Nanjing (CN); Junming Xu, Nanjing (CN); Min Wei, Nanjing (CN); Linshan Wei, Nanjing (CN); Ruizhen Wang, Nanjing (CN)

(73) Assignee: INSTITUTE OF CHEMICAL INDUSTRY OF FOREST PRODUCTS, CAF, Nanjing (CN)

( * ) Notice: Subject to any disclaimer, the term of this patent is extended or adjusted under 35 U.S.C. 154(b) by 496 days.

(21) Appl. No.: 16/960,895

(22) PCT Filed: Aug. 16, 2019

(86) PCT No.: PCT/CN2019/100944
§ 371 (c)(1),
(2) Date: Jul. 9, 2020

(87) PCT Pub. No.: WO2020/258463
PCT Pub. Date: Dec. 30, 2020

(65) Prior Publication Data
US 2022/0002446 A1    Jan. 6, 2022

(30) Foreign Application Priority Data
Jun. 26, 2019 (CN) .......................... 201910565250.2

(51) Int. Cl.
*C08B 37/00* (2006.01)
(52) U.S. Cl.
CPC .................. *C08B 37/0057* (2013.01)
(58) Field of Classification Search
CPC .................. C08B 37/0057; C08B 37/00
See application file for complete search history.

(56) References Cited

U.S. PATENT DOCUMENTS

2010/0170504 A1*  7/2010  Zhang .................. C13K 1/02
127/37

FOREIGN PATENT DOCUMENTS

| CN | 101586136 A | * | 11/2009 |
|----|-------------|---|---------|
| CN | 102276760 A | * | 12/2011 |
| CN | 102702144 A | * | 10/2012 |
| CN | 103480627   |   | 1/2014  |
| CN | 104404803   |   | 3/2015  |
| CN | 105672012   |   | 6/2016  |
| CN | 109535109   |   | 3/2019  |

OTHER PUBLICATIONS

Qu et al "Experimental Study of Biomass Pyrolysis Based on Three Major Components: Hemicllulose, Cellulsoe, and Lignin", Industrial & Engineering Chemistry Research, vol. 50, pp. 10424-10433 (Year: 2011).*

"International Search Report (Form PCT/ISA/210) of PCT/CN2019/100944," dated Mar. 20, 2020, pp. 1-5.

* cited by examiner

*Primary Examiner* — Leigh C Maier
*Assistant Examiner* — Everett White
(74) *Attorney, Agent, or Firm* — JCIPRNET (57) ABSTRACT

The invention proposes a method of separating hemicellulose through efficient pretreatment of fibrous biomass materials. Fibrous biomass materials are first pretreated by the slurry method: the fibrous biomass materials are milled through ball mills and sieved to obtain fibrous biomass material powder, and the powder is mixed with water at room temperature to obtain slurry premixed solution of the fibrous biomass material powder. Through regulation and control of the reaction temperature, the time and the water amount, efficient hydrothermal removal of hemicellulose from the fibrous biomass material powder is realized. After the mixed solution is filtered, the filtrate is subject to gradient sedimentation to separate hemicellulose with low dispersity, and the sediment is then dried before storage. After the filter residue is mixed with polar aprotic solvent and water, and heated and stirred in a pressurized reactor, high-purity cellulose is obtained through filtering and separation.

14 Claims, 5 Drawing Sheets

METHOD OF SEPARATING HEMICELLULOSE THROUGH EFFICIENT PRETREATMENT OF FIBROUS BIOMASS AND COMPREHENSIVELY UTILIZING THE SAME

CROSS-REFERENCE TO RELATED APPLICATION

This application is a 371 of international application of PCT application serial no. PCT/CN2019/100944, filed on Aug. 16, 2019, which claims the priority benefit of China application no. 201910565250.2, filed on Jun. 26, 2019. The entirety of each of the above mentioned patent applications is hereby incorporated by reference herein and made a part of this specification.

BACKGROUND

Technical Field

The invention relates to a method of separating low-dispersity hemicellulose through pretreating fibrous biomass with a hydrothermal method, and then separating high-purity cellulose and lignin-based dissociative polyphenol through directional liquefaction, and belongs to the technology of pretreating woody fibrous biomass.

Description of Related Art

In recent years, with exhaustion of non-renewable fossil resources and increasing environment pollution around the world, people pay more and more attention to production of energies or chemicals by using renewable resources to satisfy the demands of the human society. Biomass is in abundant reserves and is a renewable and cheap resource. The biomass resources play increasingly important roles in the progress of the human society and are considered as a kind of most effective renewable resources which can partially substitute oil resources. Fibrous biomass is a kind of abundant biomass resources which can be directly converted to liquid fuel and chemicals, and is therefore regarded as an ideal substitute of the fossil resources.

The fibrous biomass has complex constituents. The fibrous biomass mainly contains three constituents, cellulose, hemicellulose and lignin, among which the cellulose content is 30-40%, the hemicellulose content is 15-30%, and the lignin content is 20-30%. Pure cellulose is used as the raw material to directly prepare liquid fuel like ethyl alcohol and butanol or high value-added chemicals like levulinic acid and furaldehyde through acid hydrolysis or enzyme hydrolysis. The technological process is simple, the products are easy to separate and purify, and thus the process has been put applied in industrial production around the world. However, if the cheap fibrous biomass is directly used as the raw material, the technological process is lengthy, the products have complex constituents and low stability, and thus are difficult to be used as high value-added liquid fuel and chemicals. Complex refining processes are required. Besides, for different fibrous biomass materials, the three constituents are of diversified content and categories. Industrial catalyst or biological enzyme easily gets inactive with the existence of phenolic substances or humin obtained in depolymerization of the fibrous biomass, such that further direct hydrolysis of the fibrous biomass into ethyl alcohol becomes a difficulty. A method of effectively solving the above-mentioned problem is to use an efficient pretreatment method, namely, selectively hydrolyzing hemicellulose in the fibrous biomass materials into oligosaccharide, to obtain cellulose and lignin with large physical differences, and then respectively depolymerizing cellulose and lignin further into high value-added liquid fuel and chemicals. Therefore, efficient removal of hemicellulose from the fibrous biomass materials through mild hydrolysis becomes a key of the research.

The existing biomass hydrolysis methods mainly include acid hydrolysis, alkaline hydrolysis and enzyme hydrolysis.

Among a number of pretreatment methods, dilute acid is one of the pretreatment methods, which is researched the earliest and most deeply, applied the most broadly, the most effective and relative cheap. Dilute acid can effectively hydrolyze hemicellulose, convert 80%-90% of hemicellulose into sugar, and help hydrolyze and saccharify enzyme of cellulose with low costs. The reaction mechanism of acid hydrolysis can be simply summarized as combining hydrogen ions generated through acid dissociation in water with water to generate hydronium ions ($H_3O^+$) which can rapidly protonize oxygen atoms of glycosidic bonds in hemicellulose macromolecules to generate conjugate acid, such that the glycosidic bonds get weak bond energy and get broken, and carbonium ions formed at the ends react with water, to finally generate monosaccharide and release protons. Protons react with water to generate hydronium ions which continue taking part in further hydrolysis. Acid hydrolysis can have various types depending on different criteria. By the reaction temperature, dilute acid hydrolysis of hemicellulose can be categorized into high-temperature hydrolysis (>160° C.) and low-temperature hydrolysis. High-temperature hydrolysis can effectively help remove hemicellulose and obtain dissolved sugar, while in low temperature, different parts of hemicellulose are hydrolyzed at different difficult degree. By the acid concentration, acid hydrolysis can be categorized into dilute acid hydrolysis, extremely low acid hydrolysis and acid-free hydrolysis. The three categories have similar reaction mechanism, but differ in product types and content. The content of oligosaccharide in sugar generated through extremely low acid hydrolysis and acid-free hydrolysis is far higher than in dilute acid hydrolysis, more degradation products are generated, but the production efficiency is lower. Dilute acid hydrolysis of hemicellulose is complex. The hydrolysis products are diversified, which are influenced by factors like the category, the place of origin and the grain size of the biomass, acid category and concentration, and reaction temperature and time. Among the factors, the acid category and concentration and the reaction temperature are primary factors influencing the acid hydrolysis effect. Since sugar generated in hemicellulose hydrolysis is further degraded in acid solution, in the normal hydrolysis conditions (temperature: 80~200° C.; acid concentration: 0~6%), in addition to sugar, the main hemicellulose hydrolysis products also include furfural, 5-hydroxymethyl furfural, acetic acid, methanoic acid and levulinic acid. Industrially, furfural is produced by a one-step method or a two-step method by using the principle. Acid hydrolysis requires short treatment time, short treatment period and low product costs. However, acid hydrolysis has problems as special acid-resistant equipment is required, the generated sugar is degraded partially, and the hydrolysate needs neutralization. If the hydrolysate is used to produce bioethanol, the problems of low sugar concentration, need of detoxification treatment and low xylose utilization ratio will appear, leading to low economical efficiency of the hydrolysate.

Alkali commonly used in alkali treatment includes NaOH, KOH, Ca(OH)$_2$ and ammonium hydroxide. Researches show that by using the thermal NaOH pretreatment method, not only hemicellulose can be removed, but also lignin can be removed to a certain extent, and the hemicellulose content drops remarkably along with higher NaOH concentration. In fact, researches find that through thermo-alkali pretreatment, typical hemicellulose removal function of steam explosion (180~210° C.) and the hydrothermal method (160~240° C.) can be realized at a low temperature (121° C.), and lignin can be removed to a certain extent. This is very favorable for subsequent cellulose enzymolysis to produce bioethanol. However, for biomass with low lignin content, higher thermo-alkali treatment intensity can lead to lower sugar yield rate and yield. The production process needs to be further optimized in order to take both the sugar yield rate and the effect of thermo-alkali treatment into account. Besides, since lignocellulose is pretreated through alkaline hydrolysis, a large amount of inhibitor like ferulic acid, acetic acid and furaldehyde is generated during the process, and the subsequent hydrolysis and fermentation for producing ethyl alcohol is inhibited. Therefore, subsequent detoxification shall be taken into consideration to avoid death of inoculated zymocyte and inability of bioethanol survival.

The traditional acid and alkaline hydrolysate contain harmful substances unfavorable for later growth of microorganisms and thus needs to be detoxified in advance. Heer et al. found in the research that existence of HMF and furaldehyde decreased the growth speed of microorganisms and affected the ethyl alcohol yield. Therefore, enzyme hydrolysis is more environment-friendly. The hydrolysate is treated in a much easier way in order to meet the subsequent technological conditions. The method is very significant for energy conservation and environment protection. However, hemicellulose has very complex structure and components, and contains different side-chain substituent groups in addition to the main chain formed by connecting β-1,4 glycosidic bonds with xylose. To completely hydrolyze hemicellulose, synergistic effect of various enzymes in the enzyme system for enzyme hydrolysis of hemicellulose is required. The enzyme system mainly contains endo-xylanase and β-xylosidase in the main chain for degrading xylan, as well as α-arabinfuranosidease, α-glucuronidase, acetylxylan esterases and phenol aid esterases in the side chains for degradation. Compared to other hydrolytic enzyme in the enzyme system, α-glucuronidase is discovered later. Currently, there's a few researches on the specific catalytic mechanism of α-glucuronidase in xylan hydrolysis. It is only known that due to the low total activity, the corresponding enzymatic reactions are usually control steps of serial hydrolysis reactions of hemicellulose. There are not many researches on enzyme hydrolysis methods of hemicellulose, possibly because the chemical and physical removal processes are simple with high removal rate, but enzyme requires high costs, leading to low economic efficiency.

The density of supercritical water sharply increases along with pressure rise, thus greatly improving the solvability of water, and improving the solubility of biomass materials; the physical properties of supercritical water like viscosity and diffusion coefficient are similar to gas, thus effectively reducing the mass transfer resistance in reaction and improving the reaction rate; the ion product of water increases at high temperature and high pressure, making water show strong acid and alkali properties and allowing biomass hydrolysis equivalent to acid catalysis to occur in supercritical water, without the problem of liquid waste treatment. Therefore, the supercritical/subcritical hydrolysis method has unique advantages of high reaction rate, no solvent pollution and high conversion rate, but is not technically mature. The method was first proposed to be applied in cellulose hydrolysis. Schacht et al. treated the raw materials in three different temperature phases, and separated the liquid product dissolved in the temperature phases. They believed that hemicellulose was dissolved at 180~210° C., and proved that the method was feasible. But their current researches mainly focus on cellulose and pay less attention to hemicellulose.

Supercritical carbon dioxide pretreatment means to infiltrate supercritical carbon dioxide molecules into the internal pores of lignocellulose at high temperature and high pressure, destroy encapsulation of hemicellulose and lignin to cellulose through the blasting action generated during quick pressure relief, increase the contactable surface area of cellulose in subsequent enzyme hydrolysis, and improve the reducing sugar yield rate of hydrolysis. Narayanaswamy et al. found in the researches that supercritical carbon dioxide pretreatment has different effects for different types of lignocellulosic biomass. Besides, by pretreating the same type of lignocellulosic biomass in different supercritical carbon dioxide pretreatment conditions, the reducing sugar yield rate is different in the subsequent enzyme hydrolysis. However, due to limited cognition, most scholars focus on the major factors in the supercritical carbon dioxide pretreatment conditions affecting the pretreatment results currently, and there's no specific researches on the effect of hemicellulose removal yet.

The acid hydrolysis process is mature, but has the problems of equipment corrosion, environment pollution by the liquid waste of reaction and complex after-treatment steps. Alkaline hydrolysis is not as widely applied as acid hydrolysis. Thanks to the advantages of good selectivity, mild reaction conditions, environment friendliness and simple equipment, enzyme hydrolysis attracts more and more attention, but is hard to be industrially applied in large scale due to long reaction period, difficult cellulase preparation and purification, and high price.

There are many methods of removing hemicellulose; especially, there are diversified methods of acid hydrolysis. However, currently mature technologies still have problems unsolved or aspects to be improved:

(1) Acid hydrolysis and alkaline hydrolysis have high corrosiveness, complex liquid waste and waste residue after-treatment, and high process cost.

(2) Enzyme hydrolysis has long reaction duration, difficult cellulase purification and high price.

(3) Supercritical pretreatment requires harsh technological conditions and large equipment investment.

(4) In most existing pretreatment methods, hemicellulose is hydrolyzed into small-molecule substances like furaldehyde and acetic acid while lignin and cellulose are depolymerized, the added value is low, and high value-added full-quality utilization of biomass with high hemicellulose content can hardly be realized.

Therefore, the key of realizing high value-added full-quality utilization of biomass with high hemicellulose content is to choose a pretreatment system which is well selective to hemicellulose, so as to gradually and efficiently separate hemicellulose and lignin in the woody fibrous materials, and finally obtain low-dispersity hemicellulose, high-purity cellulose and lignin-based dissociative polyphenol with high added values.

SUMMARY

The invention aims to provide a method having good industrial application prospect with good raw material adaptability, low cost, simple, efficient and highly operable raw material pretreatment, high preparation process operability, high recyclability of the solvent and high added value of pretreatment products.

The invention adopts the following technical scheme: a method of separating hemicellulose through efficient pretreatment of fibrous biomass and comprehensively utilizing the same, wherein a logging and processing residue of fibrous biomass is used as raw materials, and a slurry-method pretreatment is performed through ball milling, water addition and stirring, to obtain slurry premixed solution containing fibrous biomass material powder; wood fibers of the fibrous biomass materials are heated to realize hydrothermal pretreatment; after the wood fibers are filtered, the filtrate is subject to gradient sedimentation to obtain hemicellulose with low dispersity, and the filtrate is distilled to recycle water; after a filter residue is mixed with polar aprotic solvent and water, and directional liquefaction is performed through pressurized reaction, filter cakes are separated and filtered out, washed with water and dried to obtain high-purity cellulose; after the filtrate is added with water, stirred and kept still, a light brown lignin-based dissociative polyphenol which is separated out is filtered, separated, dried and stored, the filtrate is distilled at reduced pressure to gradually separate water and a small amount of small-molecule by-products of 5-hydroxymethyl furfural and furfural; the final residual polar aprotic solvent and water obtained through fractional separation are mixed at a certain proportion to be recycled; the content of hemicellulose in the fibrous biomass is larger than 20 wt %.

The method of separating hemicellulose through efficient pretreatment of fibrous biomass and comprehensively utilizing the same, comprising the following steps:

Step 1: slurry-method pretreatment: after the logging and processing residue of the fibrous biomass materials is crushed through a ball mill, the fibrous biomass material powder obtained is mixed with water and uniformly stirred at room temperature to obtain a premixed solution;

Step 2: hydrothermal pretreatment: the premixed solution is supplemented with a certain amount of water, stirred and gradually heated to 160-220° C. as pretreatment for 20-120 minutes, and then cooled down to room temperature and filtered;

Step 3: gradient sedimentation and separation: the filtrate obtained in step 2 is added with absolute ethyl alcohol at room temperature and filtered after centrifugal separation reaction is completed, and the filter cakes are washed with ethyl alcohol and dried through vacuum freezing; the above-mentioned operations are repeated to add more absolute ethyl alcohol in the filtrate, until the ethyl alcohol content reaches 20%-75%; the filter cakes obtained are hemicellulose with low dispersity, and the filtrate is rectified to recycle water and ethyl alcohol to be reused;

Step 4: directional liquefaction and separation: the filter residue obtained in step 2 is mixed with complex solvent of the polar aprotic solvent and water, stirred and heated in a pressurized way to 140-240'C for sufficient reaction for 10-180 minutes, and filtered after the reaction is completed, and the filter cakes are washed with water and dried to obtain high-purity cellulose; after the filtrate is added with water, stirred and kept still, the light brown lignin-based dissociative polyphenol which is separated out is filtered, separated, dried and stored, the filtrate is distilled at reduced pressure to gradually separate water and a small amount of small-molecule by-products of 5-hydroxymethyl furfural and furfural; the final residual polar aprotic solvent and water obtained through fractional separation are mixed at a certain proportion to be recycled.

In the slurry-method pretreatment and the hydrothermal pretreatment, the mass ratio of the fibrous biomass material powder to water is 1:5-20.

In the directional liquefaction process, the mass ratio of the filter cakes to the complex solvent of the polar aprotic solvent and water is 1:1-30.

The mass ratio of the polar aprotic solvent to water in the complex solvent system of the polar aprotic solvent and water is 9:1.

The polar aprotic solvent is any one of sulfolane, γ-valerolactone, N,N-dimethylformamide, dimethyl sulfoxide, tetrahydrofuran and 1,3-dimethyl-2-imidazolinone.

The solvent and the water which are used can both be recycled.

The fibrous biomass is any one of paper mulberry, corncob, willow, cottonwood, birch, wheat straws, rice straws, cotton stalks and corn stalks.

Beneficial Effects

1. Since the hemicellulose content of paper mulberry is up to 40%, which is far higher than the 20% content of ordinary trees, in ordinary pretreatment processes, a large amount of hemicellulose is removed as waste while lignin or cellulose in paper mulberry is separated, leading to waste of the hemicellulose resources. In the invention, hemicellulose is first efficiently separated through the slurry-method pretreatment and the hydrothermal pretreatment, and low-dispersity hemicellulose with high added value is obtained through gradient sedimentation. Lignin is efficiently depolymerized into dissociative polyphenol through directional liquefaction of residual products to finally obtain high-purity cellulose and realize full-quality, high value-added and comprehensive utilization of logging and processing residue of paper mulberry.

2. The method of the invention does not have special requirement on the water content of the paper mulberry materials. The method is applicable for fibrous biomass materials with hemicellulose content of higher than 20%, like corncob, willow, cottonwood, birch, wheat straws, rice straws, cotton stalks, corn stalks, etc. The raw materials can originate from extensive sources and require low industrial costs.

3. The method of the invention has high process operability, high boiling point of the polar aprotic solvent used, low saturated vapor pressure, good thermal stability and chemical stability, and good selectivity to lignin. In addition to efficient depolymerization of lignin, high-purity cellulose can also be separated efficiently.

4. The solvent and catalyst used in the method of the invention can both be effectively recovered and reused, and are thus environment-friendly.

5. In the method of the invention, the slurry-method pretreatment and the hydrothermal pretreatment are performed to the woody fibrous materials, with mild reaction conditions and simple and efficient operation.

6. In the method of the invention, the logging and processing residue of paper mulberry of low cost is used as the raw materials to be subject to simple slurry-method pretreatment, hydrothermal pretreatment and directional liquefaction, so as to obtain low-dispersity hemicellulose, high-purity cellulose and lignin-based dissociative polyphenol with high added values, and realize low-cost, high value-added and full-quality utilization of the woody fibrous materials.

DESCRIPTION OF THE EMBODIMENTS

The invention will be further explained in details in combination with the attached drawings.

Figure 1:
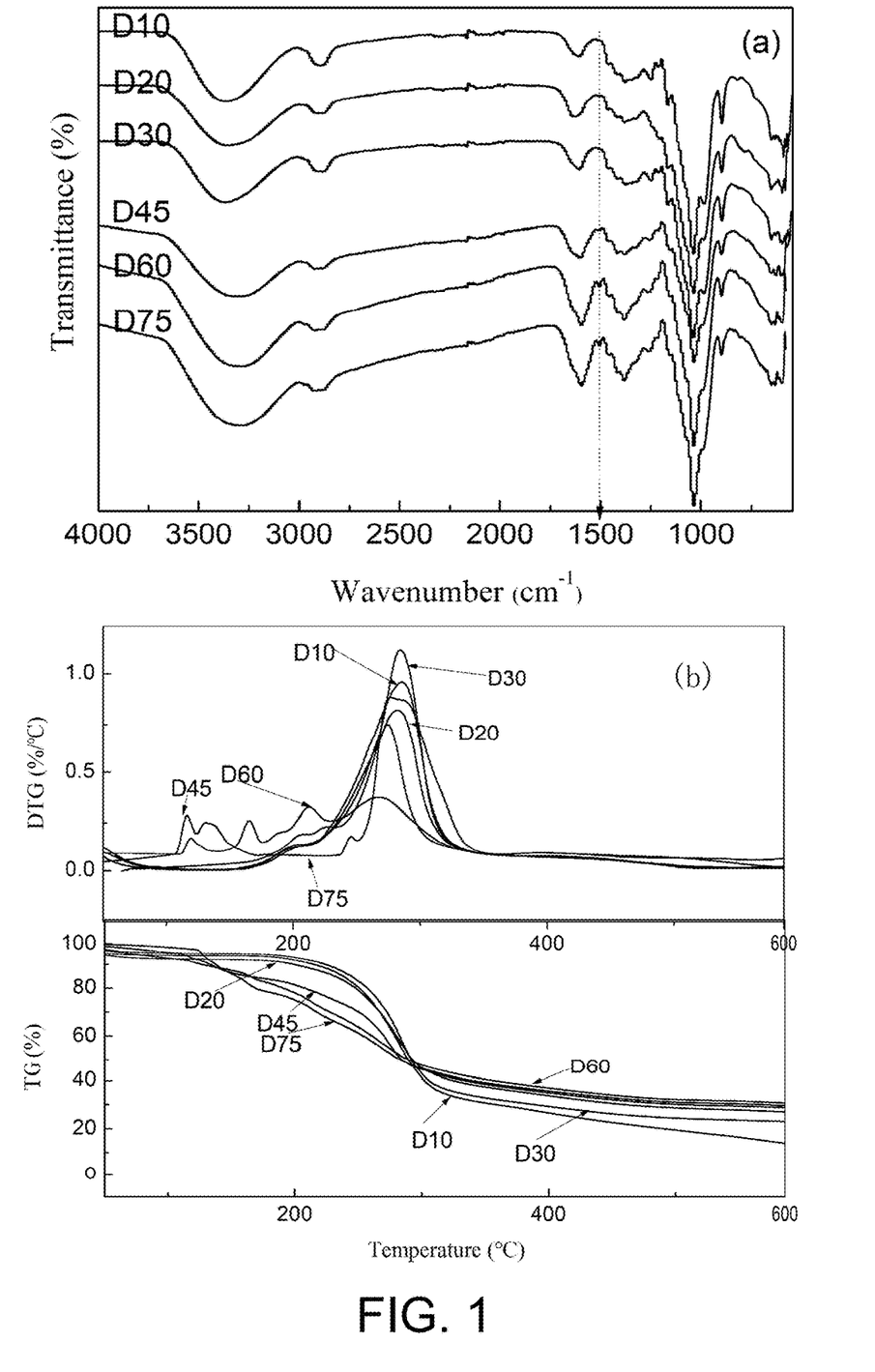
FIG. 1 shows the FT-IR (a) and TG-DTG curve (b) of low-dispersity hemicellulose obtained through gradient sedimentation using ethyl alcohol of different concentration (10%, 20%, 30%, 45%, 60% and 75%)
Figure 2:
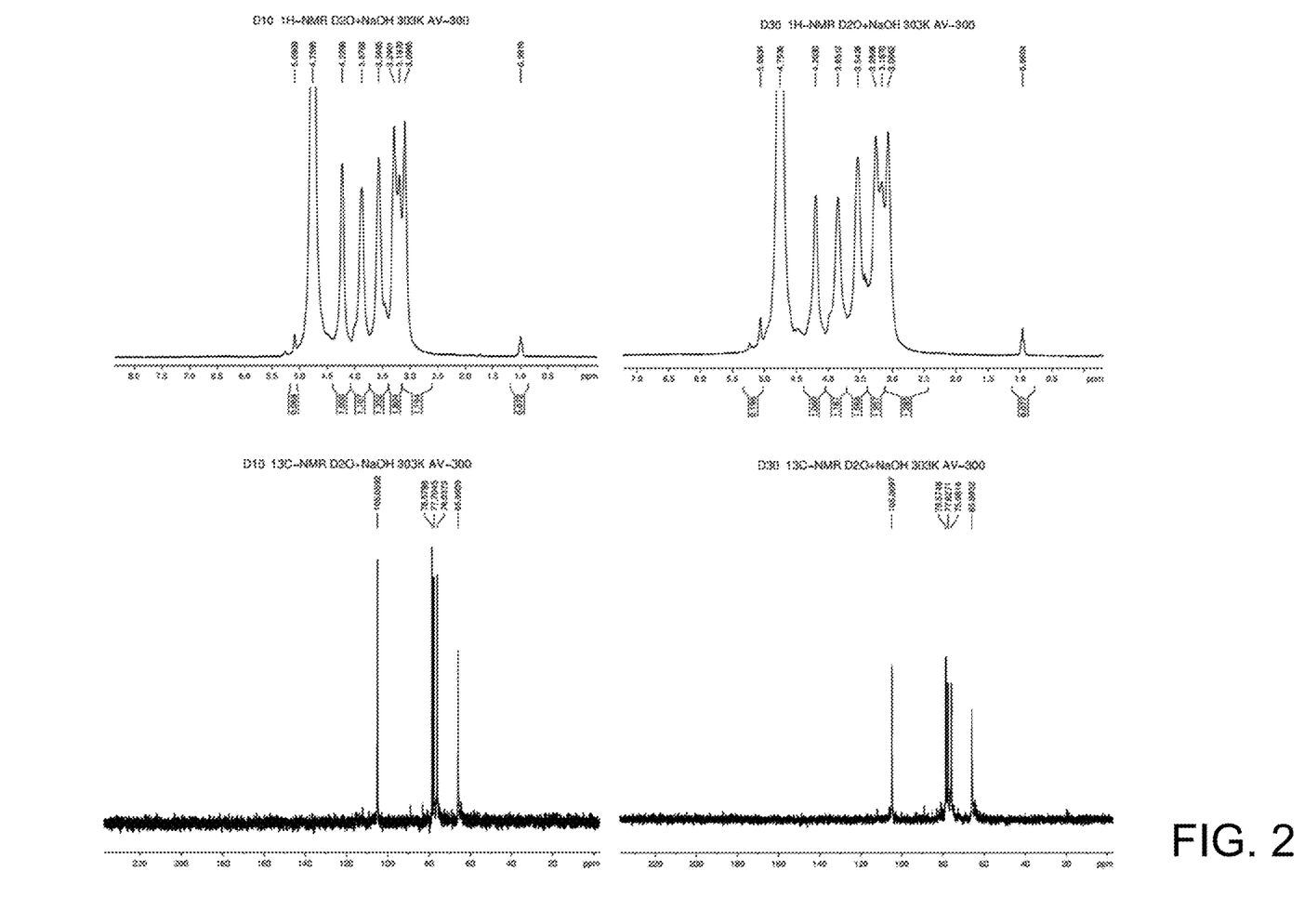
FIG. 2 shows the NMR spectrum (H-NMR and C-NMR) of low-dispersity hemicellulose obtained through gradient sedimentation using ethyl alcohol of different concentration (10% and 30%)
Figure 3:
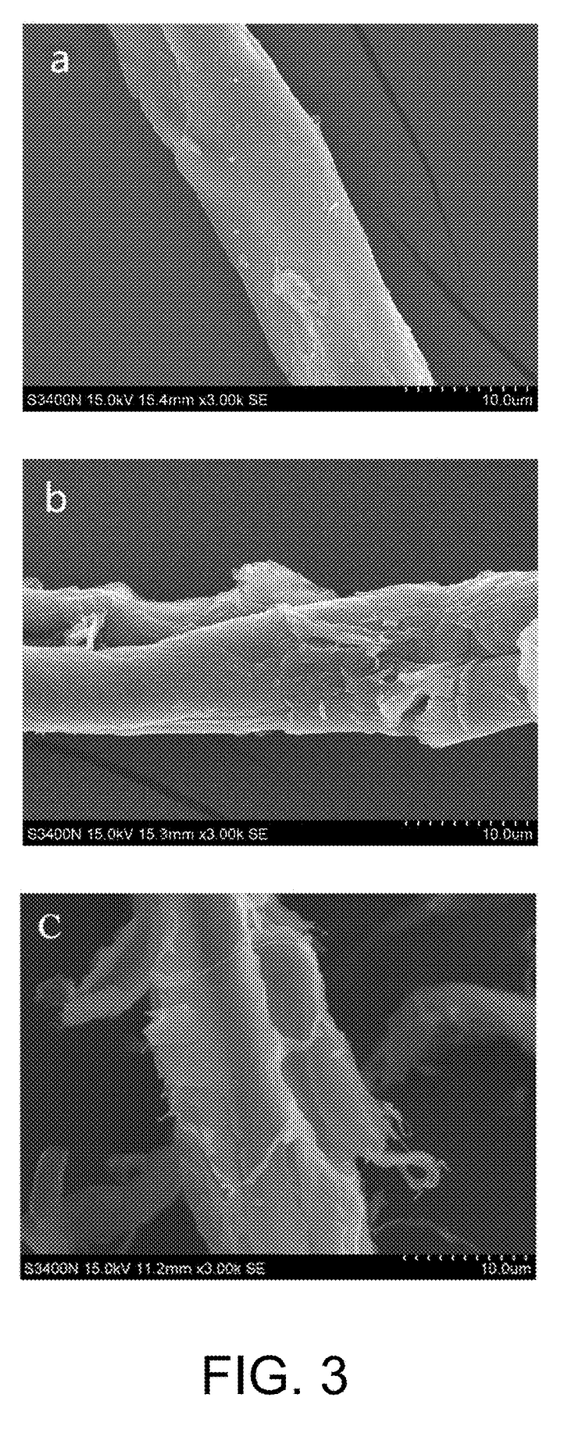
FIG. 3 shows the SEM image of paper mulberry powder material (a), filter cakes (b) obtained through hydrothermal pretreatment and hemicellulose separation, and filter cakes (high-purity cellulose) (c) obtained through directional liquefaction and lignin separation.
Figure 4:
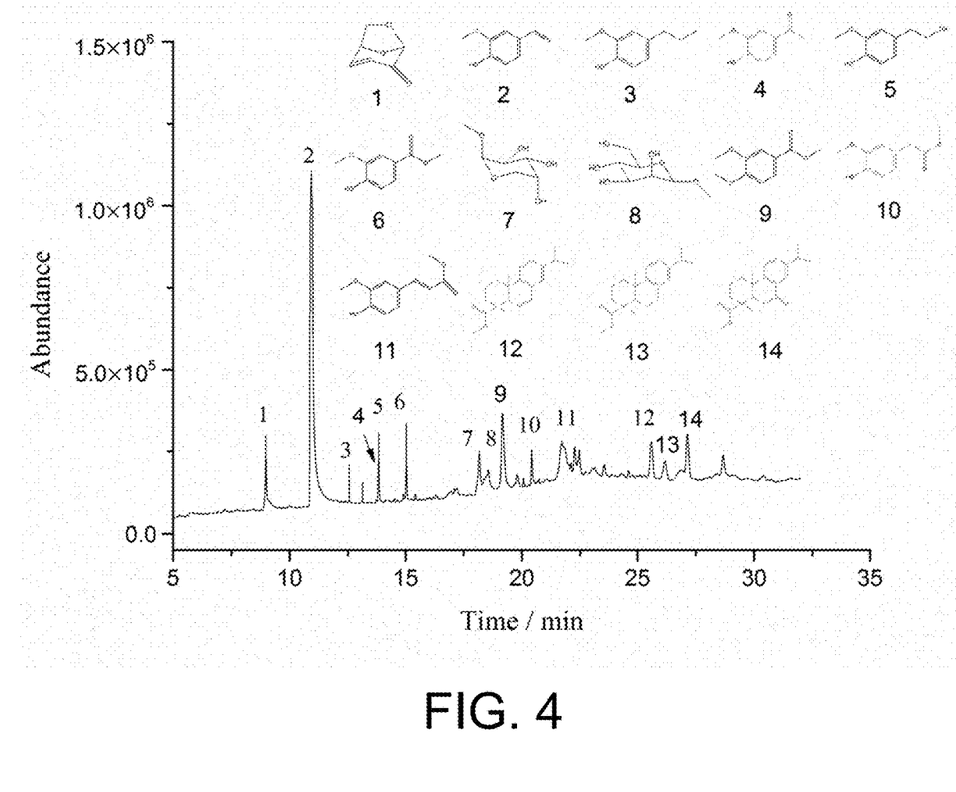
FIG. 4 shows the mass spectrum of lignin-based dissociative polyphenol obtained through separation.
Figure 5:
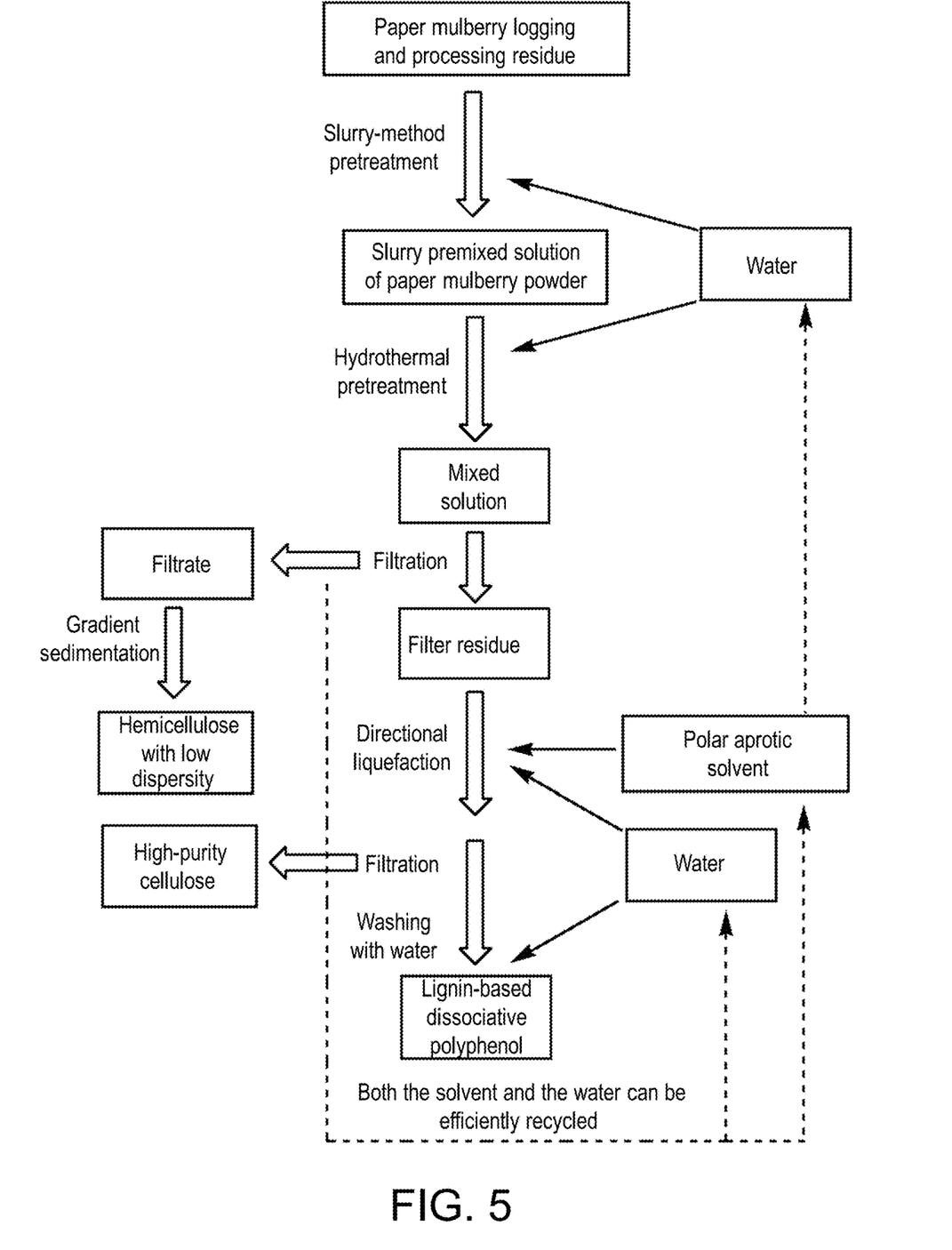
FIG. 5 shows the flowchart of preparing low-dispersity hemicellulose, high-purity cellulose and lignin-based dissociative polyphenol with high added values by using the logging and processing residue of paper mulberry of low cost as the raw materials.

As shown in FIG. 5, the logging and processing residue of paper mulberry with rich hemicellulose are used as the raw materials; the paper mulberry materials are first pretreated by the slurry method to obtain slurry premixed solution; the woody fibers of paper mulberry are pretreated hydrothermally in a pressurized reactor; after the system pretreated through liquefaction is filtered, the filtrate is subject to gradient sedimentation to obtain hemicellulose with low dispersity, and the liquid is distilled to recycle water. After the filter residue is mixed with a certain amount of polar aprotic solvent and water and directionally liquefied in the pressurized reactor, the filter cakes separated are filtered, washed with water and dried to obtain high-purity cellulose. After the filtrate is added with water, stirred and kept still, the light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

A method of separating hemicellulose through efficient pretreatment of paper mulberry and comprehensively utilizing the same, comprising the following specific steps:

Step 1: slurry-method pretreatment: the logging and processing residue of paper mulberry is crushed with a ball mill and sieved (40-180 meshes), and the paper mulberry powder obtained and a certain amount of water (mass ratio: 1:5-10) are mixed, dosed into a premixing tank, stirred for 10-60 minutes at room temperature and transferred to a pressurized reactor.

Step 2: hydrothermal pretreatment: the premixed solution is supplemented with a certain amount of water (mass ratio: 1:10-20), stirred and gradually heated to 160-220° C. as pretreatment for 20-120 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are stored as low-dispersity hemicellulose. The filtrate is rectified to recycle water and ethyl alcohol to be reused.

Step 4: directional liquefaction and separation: the filter residue obtained in step 2 is mixed with a certain amount of complex solvent of the polar aprotic solvent and water (mass ratio of the filter residue to the complex solvent: 1:1-30), stirred and heated in a pressurized way to 140-240° C. for sufficient reaction for 10-180 minutes, and filtered after the reaction is completed, and the filter cakes are washed with water and dried to obtain high-purity cellulose. After the filtrate is added with water, stirred and kept still, the light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

All the solvent and the water used can be recycled and reused.

Solvent: polar aprotic solvent and ethyl alcohol, industrial grade; deionized water.

The above-mentioned reaction process will be described below by means of embodiments.

Embodiment 1

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180'C as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.2 g low-dispersity hemicellulose (coefficient of dispersion: 1.17-1.52) for storage. The filtrate is rectified to recycle water and ethyl alcohol to be reused.

Step 4: directional liquefaction and separation: the 5.5 g filter residue obtained in step 2 is mixed with 55 g complex solvent of sulfolane and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.3 g high-purity cellulose. After the filtrate is added with water, stirred and kept still, the 1.4 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 2

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (40 meshes), and the paper mulberry powder obtained and a certain amount of water (mass ratio: 1:5) are mixed, dosed into a premixing tank, stirred for 10 minutes at room temperature and transferred to a pressurized reactor.

Step 2: hydrothermal pretreatment: the premixed solution is supplemented with a certain amount of water (mass ratio: 1:10), stirred and gradually heated to 160° C. as pretreatment for 120 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 3.9 g low-dispersity hemicellulose (coefficient of dispersion: 1.30-1.65) for storage. The filtrate is rectified to recycle water and ethyl alcohol to be reused.

Step 4: directional liquefaction and separation: the 5.8 g filter residue obtained in step 2 is mixed with 116 g complex solvent of sulfolane and water (mass ratio of the filter residue to the complex solvent: 1:20), stirred and heated in a pressurized way to 240° C. for reaction for 10 minutes, and filtered after the reaction is completed, and the filter cakes are washed with water and dried to obtain 3.4 g high-purity cellulose. After the filtrate is added with water, stirred and kept still, the 1.5 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 3

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (120 meshes), and the paper mulberry powder obtained and a certain amount of water (mass ratio: 1:7) are mixed, dosed into a premixing tank, stirred for 30 minutes at room temperature and transferred to a pressurized reactor.

Step 2: hydrothermal pretreatment: the premixed solution is supplemented with a certain amount of water (mass ratio: 1:15), stirred and gradually heated to 220° C. as pretreatment for 20 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.1 g low-dispersity hemicellulose (coefficient of dispersion: 1.26-1.59) for storage. The filtrate is rectified to recycle water and ethyl alcohol to be reused.

Step 4: directional liquefaction and separation: the 5.6 g filter residue obtained in step 2 is mixed with 168 g complex solvent of sulfolane and water (mass ratio of the filter residue to the complex solvent: 1:30), stirred and heated in a pressurized way to 140° C. for reaction for 180 minutes, and filtered after the reaction is completed, and the filter cakes are washed with water and dried to obtain 3.3 g high-purity cellulose. After the filtrate is added with water, stirred and kept still, the 1.3 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 4

Step 1: slurry-method pretreatment: 10 g corncob (cellulose content: 3.6 g, hemicellulose content: 3.8 g; lignin content: 1.8 g; water content: 0.7 g; ash content: 0.1 g) is crushed with a ball mill and sieved (180 meshes), and the corncob powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 3.6 g low-dispersity hemicellulose (coefficient of dispersion: 1.20-1.58) for storage. The filtrate is rectified to recycle water and ethyl alcohol to be reused.

Step 4: directional liquefaction and separation: the 5.6 g filter residue obtained in step 2 is mixed with 56 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.5 g high-purity cellulose. After the filtrate is added with water, stirred and kept still, the 1.6 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 5

Step 1: slurry-method pretreatment: 10 g logging and processing residue of willow (cellulose content: 4.4 g, hemicellulose content: 3.7 g; lignin content: 2.0 g; water content: 0.3 g; ash content: 0.5 g) is crushed with a ball mill and sieved (180 meshes), and the willow powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 3.5 g low-dispersity hemicellulose (coefficient of dispersion: 1.19-1.57) for storage. The filtrate is rectified to recycle water and ethyl alcohol to be reused.

Step 4: directional liquefaction and separation: the 6.9 g filter residue obtained in step 2 is mixed with 69 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 4.1 g high-purity cellulose. After the filtrate is added with water, stirred and kept still, the 1.8 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 6

Step 1: slurry-method pretreatment: 10 g logging and processing residue of cottonwood (cellulose content: 4.0 g, hemicellulose content: 3.3 g; lignin content: 1.8 g; water content: 0.4 g; ash content: 0.5 g) is crushed with a ball mill and sieved (180 meshes), and the cottonwood powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 3.0 g low-dispersity hemicellulose (coefficient of dispersion: 1.31-1.74) for storage. The filtrate is rectified to recycle water and ethyl alcohol to be reused.

Step 4: directional liquefaction and separation: the 6.3 g filter residue obtained in step 2 is mixed with 63 g complex solvent of N,N-dimethylformamide and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.6 g high-purity cellulose. After the filtrate is added with water, stirred and kept still, the 1.6 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 7

Step 1: slurry-method pretreatment: 10 g logging and processing residue of birch (cellulose content: 4.2 g, hemicellulose content: 2.9 g; lignin content: 1.8 g; water content: 0.4 g; ash content: 0.7 g) is crushed with a ball mill and sieved (180 meshes), and the birch powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 2.8 g low-dispersity hemicellulose (coefficient of dispersion: 1.28-1.67) for storage. The filtrate is rectified to recycle water and ethyl alcohol to be reused.

Step 4: directional liquefaction and separation: the 6.5 g filter residue obtained in step 2 is mixed with 65 g complex solvent of dimethyl sulfoxide and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.8 g high-purity cellulose. After the filtrate is added with water, stirred and kept still, the 1.5 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 8

Step 1: slurry-method pretreatment: 10 g wheat straws (cellulose content: 4.6 g, hemicellulose content: 2.6 g; lignin content: 2.3 g; water content: 0.1 g; ash content: 0.4 g) are crushed with a ball mill and sieved (180 meshes), and the wheat straw powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 2.5 g low-dispersity hemicellulose (coefficient of dispersion: 1.20-1.57) for storage. The filtrate is rectified to recycle water and ethyl alcohol to be reused.

Step 4: directional liquefaction and separation: the 7.8 g filter residue obtained in step 2 is mixed with 78 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 4.3 g high-purity cellulose. After the filtrate is added with water, stirred and kept still, the 2.0 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 9

Step 1: slurry-method pretreatment: 10 g rice straws (cellulose content: 3.5 g, hemicellulose content: 2.1 g; lignin content: 2.5 g; water content: 0.3 g; ash content: 1.6 g) are crushed with a ball mill and sieved (180 meshes), and the rice straw powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 2.0 g low-dispersity hemicellulose (coefficient of dispersion: 1.27-1.50) for storage. The filtrate is rectified to recycle water and ethyl alcohol to be reused.

Step 4: directional liquefaction and separation: the 7.5 g filter residue obtained in step 2 is mixed with 75 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.3 g high-purity cellulose. After the filtrate is added with water, stirred and kept still, the 2.3 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 10

Step 1: slurry-method pretreatment: 10 g cotton stalks (cellulose content: 3.9 g, hemicellulose content: 2.0 g; lignin content: 2.6 g; water content: 0.2 g; ash content: 1.3 g) are crushed with a ball mill and sieved (180 meshes), and the cotton stalks powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 1.9 g low-dispersity hemicellulose (coefficient of dispersion: 1.27-1.62) for storage. The filtrate is rectified to recycle water and ethyl alcohol to be reused.

Step 4: directional liquefaction and separation: the 7.4 g filter residue obtained in step 2 is mixed with 74 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.6 g high-purity cellulose. After the filtrate is added with water, stirred and kept still, the 2.4 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 11

Step 1: slurry-method pretreatment: 10 g corn stalks (cellulose content: 3.6 g, hemicellulose content: 2.8 g; lignin content: 2.0 g; water content: 0.3 g; ash content: 1.3 g) are crushed with a ball mill and sieved (180 meshes), and the corn stalks powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 2.6 g low-dispersity hemicellulose (coefficient of dispersion: 1.20-1.61) for storage. The filtrate is rectified to recycle water and ethyl alcohol to be reused.

Step 4: directional liquefaction and separation: the 7.0 g filter residue obtained in step 2 is mixed with 70 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.4 g high-purity cellulose. After the filtrate is added with water, stirred and kept still, the 1.8 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 12

The solvent used in the embodiment: ethyl alcohol, γ-valerolactone and water are all solvent recovered in embodiment 1.

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.1 g low-dispersity hemicellulose (coefficient of dispersion: 1.22-1.56) for storage. The filtrate is rectified to recycle water and ethyl alcohol to be reused.

Step 4: directional liquefaction and separation: the 5.6 g filter residue obtained in step 2 is mixed with 56 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.4 g high-purity cellulose. After the filtrate is added with water, stirred and kept still, the 1.3 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 13

The solvent used in the embodiment: ethyl alcohol, γ-valerolactone and water are all solvent recovered in embodiment 12.

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.1 g low-dispersity hemicellulose (coefficient of dispersion: 1.22-1.56) for storage. The filtrate is rectified to recycle water and ethyl alcohol to be reused.

Step 4: directional liquefaction and separation: the 5.6 g filter residue obtained in step 2 is mixed with 56 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.3 g high-purity cellulose. After the filtrate is added with water, stirred and kept still, the 1.5 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 14

The solvent used in the embodiment: ethyl alcohol, γ-valerolactone and water are all solvent recovered in embodiment 13.

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.0 g low-dispersity hemicellulose (coefficient of dispersion: 1.25-1.69) for storage. The filtrate is rectified to recycle water and ethyl alcohol to be reused.

Step 4: directional liquefaction and separation: the 5.7 g filter residue obtained in step 2 is mixed with 57 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.2 g high-purity cellulose. After the filtrate is added with water, stirred and kept still, the 1.3 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 15

The solvent used in the embodiment: ethyl alcohol, γ-valerolactone and water are all solvent recovered in embodiment 14.

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.0 g low-dispersity hemicellulose (coefficient of dispersion: 1.31-1.76) for storage. The filtrate is rectified to recycle water and ethyl alcohol to be reused.

Step 4: directional liquefaction and separation: the 5.6 g filter residue obtained in step 2 is mixed with 56 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.2 g high-purity cellulose. After the filtrate is added with water, stirred and kept still, the 1.3 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

Embodiment 16

The solvent used in the embodiment: ethyl alcohol, γ-valerolactone and water are all solvent recovered in embodiment 15.

Step 1: slurry-method pretreatment: 10 g logging and processing residue of paper mulberry (cellulose content: 3.7 g, hemicellulose content: 4.3 g; lignin content: 1.7 g; water content: 0.1 g; ash content: 0.2 g) is crushed with a ball mill and sieved (180 meshes), and the paper mulberry powder obtained and a certain amount of water (mass ratio: 1:10) are mixed, dosed into a premixing tank, stirred for 60 minutes at room temperature and transferred to a pressurized reactor.

Step 2: hydrothermal pretreatment: the premixed solution is supplemented with a certain amount of water (mass ratio: 1:20), stirred and gradually heated to 180° C. as pretreatment for 60 minutes, and then cooled down to room temperature and filtered.

Step 3: gradient sedimentation and separation: the filtrate obtained in step 2 is added with absolute ethyl alcohol of 10% at room temperature and filtered after the centrifugal separation reaction is completed, and the filter cakes are washed with ethyl alcohol and dried through vacuum freezing. The above-mentioned operations are repeated to add more absolute ethyl alcohol in the filtrate, until the ethyl alcohol content reaches 20%-75% respectively, and the filter cakes obtained are freeze-dried to obtain 4.0 g low-dispersity hemicellulose (coefficient of dispersion: 1.35-1.68) for storage. The filtrate is rectified to recycle water and ethyl alcohol to be reused.

Step 4: directional liquefaction and separation: the 5.5 g filter residue obtained in step 2 is mixed with 55 g complex solvent of γ-valerolactone and water (mass ratio of the filter residue to the complex solvent: 1:10), stirred and heated in a pressurized way to 180° C. for sufficient reaction for 90 minutes, and filtered after the reaction is completed, and the filter cakes are washed with water and dried to obtain 3.3 g high-purity cellulose. After the filtrate is added with water, stirred and kept still, the 1.4 g light brown lignin-based dissociative polyphenol which is separated out is filtered, separated, dried and stored, the filtrate is distilled at reduced pressure to gradually separate water and a small amount of small-molecule by-products, i.e., 5-hydroxymethyl furfural and furfural; the final residual polar aprotic solvent and water obtained through fractional separation are mixed at a certain proportion to be recycled.

What is claimed is:

1. A method of separating hemicellulose through efficient pretreatment of fibrous biomass and comprehensively utilizing the same, characterized in that, a logging and processing residue of fibrous biomass is used as raw materials, and a slurry-method pretreatment is performed through ball milling, water addition and stirring, to obtain a slurry premixed solution containing fibrous biomass material powder; wood fibers of the fibrous biomass materials are heated to realize hydrothermal pretreatment; after the wood fibers are filtered, the filtrate is subject to a gradient sedimentation step to obtain hemicellulose, and the filtrate is distilled to recycle water, wherein the gradient sedimentation step to obtain the hemicellulose comprises adding the filtrate with absolute ethyl alcohol at room temperature and filtering after centrifugal separation reaction is completed, and filter cakes are washed with ethyl alcohol and dried through vacuum freezing; the above-mentioned operations are repeated to add more absolute ethyl alcohol in the filtrate, until the ethyl alcohol content reaches 20%-75%; whereby the filter cakes obtained are the hemicellulose; after a filter residue is mixed with polar aprotic solvent and water, and directional liquefaction is performed through pressurized reaction, the filter cakes are separated and filtered out, washed with water and dried to obtain high-purity cellulose; after the filtrate is added with water, stirred and kept still to stop the stirring, a light brown lignin-based dissociative polyphenol which is separated out is filtered, separated, dried and stored, the filtrate is distilled at reduced pressure to gradually separate water and small-molecule by-products of 5-hydroxymethyl furfural and furfural; the final residual polar aprotic solvent and water obtained through fractional separation are mixed and recycled; the content of hemicellulose in the fibrous biomass is larger than 20 wt %.

2. The method of separating hemicellulose through efficient pretreatment of fibrous biomass and comprehensively utilizing the same according to claim 1, wherein the method comprises the following steps:
step 1: slurry-method pretreatment: after the logging and processing residue of the fibrous biomass materials is crushed through a ball mill, the fibrous biomass material powder obtained is mixed with water and uniformly stirred at room temperature to obtain a premixed solution;
step 2: hydrothermal pretreatment: the premixed solution is supplemented with water, stirred and heated to 160-220° C. as pretreatment for 20-120 minutes, and then cooled down to room temperature and filtered;
step 3: gradient sedimentation and separation: the filtrate obtained in step 2 is subjected to the gradient sedimentation step in claim 1 to obtain the hemicellulose, and the filtrate is rectified to recycle water and ethyl alcohol and are reused;
step 4: directional liquefaction and separation: the filter residue obtained in step 2 is mixed with complex solvent of the polar aprotic solvent and water, stirred and heated in a sealed way to 140-240° C. for sufficient reaction for 10-180 minutes, and filtered after the reaction is completed, and the filter cakes are washed with water and dried to obtain high-purity cellulose; after the filtrate is added with water, stirred and kept still to stop the stirring, the light brown lignin-based dissociative polyphenol which is separated out is filtered, separated, dried and stored, the filtrate is distilled at reduced pressure to gradually separate water and small-molecule by-products of 5-hydroxymethyl furfural and furfural; the final residual polar aprotic solvent and water obtained through fractional separation are mixed and recycled.

3. The method of separating hemicellulose through efficient pretreatment of fibrous biomass and comprehensively utilizing the same according to claim 2, wherein in the slurry-method pretreatment and the hydrothermal pretreatment, the mass ratio of the fibrous biomass material powder to water is 1:5-20.

4. The method of separating hemicellulose through efficient pretreatment of fibrous biomass and comprehensively utilizing the same according to claim 2, wherein in the directional liquefaction process, the mass ratio of the filter cakes to the complex solvent of the polar aprotic solvent and water is 1:1-30.

5. The method of separating hemicellulose through efficient pretreatment of fibrous biomass and comprehensively utilizing the same according to claim 2, wherein the mass ratio of the polar aprotic solvent to water in the complex solvent system of the polar aprotic solvent and water is 9:1.

6. The method of separating hemicellulose through efficient pretreatment of fibrous biomass and comprehensively utilizing the same according to claim 2, wherein the polar aprotic solvent is any one of sulfolane, γ-valerolactone, N,N-dimethylformamide, dimethyl sulfoxide, tetrahydrofuran and 1,3-dimethyl-2-imidazolinone.

7. The method of separating hemicellulose through efficient pretreatment of fibrous biomass and comprehensively utilizing the same according to claim 2, wherein the solvent and the water which are used can both be recycled.

8. The method of separating hemicellulose through efficient pretreatment of fibrous biomass and comprehensively utilizing the same according to claim 2, wherein the fibrous biomass is any one of paper mulberry, corncob, willow, cottonwood, birch, wheat straws, rice straws, cotton stalks and corn stalks.

9. The method of separating hemicellulose through efficient pretreatment of fibrous biomass and comprehensively utilizing the same according to claim 1, wherein in the slurry-method pretreatment and the hydrothermal pretreatment, the mass ratio of the fibrous biomass material powder to water is 1:5-20.

10. The method of separating hemicellulose through efficient pretreatment of fibrous biomass and comprehensively utilizing the same according to claim 1, wherein in the directional liquefaction process, the mass ratio of the filter cakes to the complex solvent of the polar aprotic solvent and water is 1:1-30.

11. The method of separating hemicellulose through efficient pretreatment of fibrous biomass and comprehensively utilizing the same according to claim 1, wherein the mass ratio of the polar aprotic solvent to water in the complex solvent system of the polar aprotic solvent and water is 9:1.

12. The method of separating hemicellulose through efficient pretreatment of fibrous biomass and comprehensively utilizing the same according to claim 1, wherein the polar aprotic solvent is any one of sulfolane, γ-valerolactone, N,N-dimethylformamide, dimethyl sulfoxide, tetrahydrofuran and 1,3-dimethyl-2-imidazolinone.

13. The method of separating hemicellulose through efficient pretreatment of fibrous biomass and comprehensively utilizing the same according to claim 1, wherein the solvent and the water used are recycled.

14. The method of separating hemicellulose through efficient pretreatment of fibrous biomass and comprehensively utilizing the same according to claim 1, wherein the fibrous biomass is any one of paper mulberry, corncob, willow, cottonwood, birch, wheat straws, rice straws, cotton stalks and corn stalks.

* * * * *